United States Patent [19]

Kobayashi

[11] Patent Number: 5,119,987
[45] Date of Patent: Jun. 9, 1992

[54] VENTILATING APPARATUS

[75] Inventor: Jun'ichi Kobayashi, Kasugai, Japan

[73] Assignee: Kabushiki Kaisha Toshiba, Kanagawa, Japan

[21] Appl. No.: 672,460

[22] Filed: Mar. 20, 1991

[30] Foreign Application Priority Data

Mar. 31, 1990 [JP] Japan .................................. 2-86009

[51] Int. Cl.$^5$ .............................................. F24F 7/08
[52] U.S. Cl. ..................................... 236/49.3; 236/51
[58] Field of Search .................................. 236/49.3, 51

[56] References Cited

U.S. PATENT DOCUMENTS

| 4,107,941 | 8/1978 | Hamilton | 236/49.3 X |
| 4,294,404 | 10/1981 | Gajjar | 236/49.3 |
| 4,407,447 | 10/1983 | Sayegh | 236/49.3 |
| 4,671,458 | 6/1987 | Fukuda et al. | 236/49.3 |

FOREIGN PATENT DOCUMENTS

| 95054 | 7/1980 | Japan | 236/51 |
| 195232 | 8/1986 | Japan | 236/51 |
| 1-47244 | 6/1989 | Japan | 236/49.3 |

Primary Examiner—William E. Tapolcai
Attorney, Agent, or Firm—Philip M. Shaw, Jr

[57] ABSTRACT

A ventilator includes a fan ventilating a room, a human body detector for sensing presence or absence of a person or persons in each of a plurality of detection areas in the room, an air pollution sensor for sensing the level of air pollution in the room, a control circuit for varying a volume of air delivered by the fan in accordance with the number of detection areas for each of which the presence of a person or persons has been detected by the human body detector, and another circuit for adding a volume of air determined in accordance with the air pollution level sensed by the air pollution sensor to the volume of air determined in accordance with the detection result of the human body detector. The volume of air caused by the fan is automatically determined in accordance with the number of persons in the room and the level of air pollution in the room.

11 Claims, 6 Drawing Sheets

VENTILATING APPARATUS

BACKGROUND OF THE INVENTION

This invention relates to a ventilating apparatus which comprises a fan for ventilating a room, and more particularly to such a ventilating apparatus wherein a human body detector detects the number of persons in the room so that the fan delivers a suitable volume of air in accordance with the result of detection by the human body detector.

It is well known that a ventilating apparatus is provided with one or more detectors for detecting the conditions of a place where the ventilating operation is performed and the operation of a fan of the ventilating apparatus is controlled based on the result of detection by the detectors. Such detectors include a temperature sensor, humidity sensor, air For example, one prior art ventilating apparatus for the ventilation of a living room is provided with a human body detector and an air pollution sensor so that the ventilation is automatically started when one or more persons enter the living room and so that a volume of air delivered by the fan for the ventilation is automatically controlled in accordance with the detected level of air pollution. However, the conventional human body detector can detect the presence or absence of persons but cannot detect the number of persons. Accordingly, it is difficult to control the volume of air suitable for the number of persons in the room.

To solve the above-described problem, the prior art has paid attention to the interrelation between the capacity of a room and the supposed number of persons suitable for the room capacity. When the human body detector detects the presence of one or more persons in the room, the standard volume of air delivered by the fan is controlled so as to be in accordance with the supposed number of persons depending upon the room capacity. When the level of air pollution in the room is raised, the volume of air delivered by the fan is determined by adding the volume of air in accordance with the air pollution level to the standard volume of air.

In accordance with the above-described control method, however, the standard volume of air delivered by the fan is based on the room capacity and not on the actual number of persons in the room. Consequently, the volume of air delivered by the fan becomes too large even when only one person is in a relatively large room, resulting in over driving of the fan.

The air pollution sensor includes a gas sensor for sensing the carbonic acid gas, odor gas and the like. In this respect, the level of room interior air pollution, particularly, the carbonic acid density depends upon the number of persons in the room but the number of persons in the room cannot be exactly detected by the air pollution sensor. The reason for this is that the sensor has only three levels of gas density sensing, that is, the levels of no pollution, low pollution and high pollution and that the air pollution sensor cannot sense the difference in the carbonic gas density in accordance with the number of persons in the room.

SUMMARY OF THE INVENTION

Therefore, an object of the present invention is to provide a ventilating apparatus wherein the volume of air delivered by the fan for the ventilation is automatically selected in accordance with the number of persons in a room.

Another object of the invention is to provide a ventilating apparatus wherein the volume of air delivered by the fan for the ventilation is automatically selected in accordance with both the number of persons in the room and the degree of pollution of the room interior air.

The present invention provides a ventilating apparatus comprising fan means for ventilating a room, a human body detector for detecting the presence or absence of a person or persons in each of a plurality of detection areas in the room, and control means for varying a volume of air delivered by the fan means for the ventilation in accordance with the number of detection areas for each of which the presence of a person or persons has been detected by the human body detector.

Since the human body detector detects the presence or absence of a person or persons in each of a plurality of detection areas in the room, the number of persons in the room can be detected. The volume of air delivered by the fan means for the ventilation is determined in accordance with the number of persons detected by the human body detector and consequently, the volume of air delivered by the fan means for the ventilation may be prevented from being too small or too large.

It is preferable that the human body detector be swung about to detect the presence or absence of a person or persons in the detection areas in the room. Alternatively, a plurality of human body detectors may be provided to detect the presence or absence of a person or persons in the respective detection areas in the room.

It is preferable that ventilating openings be provided so that the number of them corresponds to that of the detection areas in the room and that when the human body detector detects the presence of one or more persons in one or more detection areas in the room, the corresponding ventilating openings be selectively opened. In this case, since the ventilating opening or openings corresponding to the detection area or areas are opened when the presence of a person or persons is detected in the detection area or areas, the ventilation may efficiently be limited only to the area or areas where the ventilation is necessary.

It is preferable that the ventilating apparatus further comprise an air pollution sensor for sensing the level of air pollution in the room and that the control means comprise means for adding a volume of air in accordance with the air pollution level sensed by the air pollution sensor to the volume of air determined in accordance with the detected number of persons. In this case, since the volume of air delivered by the fan means for the ventilation may be increased in accordance with the degree of room interior air pollution, the room may be ventilated more quickly when the room is filled with smoke or the like.

For the purpose of saving heat energy, it is preferable that the ventilating apparatus further comprise a heat exchanger performing a heat exchange between indoor air exhausted to the outdoors with the operation of the fan-means and outdoor air supplied into the indoors with operation of the fan means, an exhaust by-pass through which the indoor air is exhausted to the outdoors without passing, through the heat exchanger, a suction by-pass through which the outdoor air is supplied into the indoors without passing through the heat exchanger and the control means comprise means for exhausting the indoor air to the outdoors and introducing the outdoor air to the indoors through the respective exhaust and suction by-passes when the level of air pollution sensed by the air pollution sensor exceeds a predetermined level. When the air pollution level is high or when the difference between the indoor and outdoor temperatures is large, the indoor air and the outdoor air are caused to pass through the respective exhaust and suction by-passes without passing the heat exchanger. Thus, in one case where the indoor and outdoor airs are caused to pass through the respective by-passes when the air pollution level is high, the ventilation capacity is increased as the result of a reduced passage resistance even without increasing the speed of the fan motor, which can provide rapid ventilation. Furthermore, since a heat exchange is not necessary between the indoor and outdoor airs when the difference between the indoor and outdoor temperatures is small, an uneconomical operation of the heat exchanger can be prevented.

Other objects of the present invention will become obvious upon understanding of the illustrative embodiment about to be described or will be indicated in the appended claims. Various advantages not referred to herein will occur to one skilled in the art upon employment of the invention in practice.

BRIEF DESCRIPTION OF THE DRAWINGS

FIG. I is a longitudinal section of a ventilating apparatus of an embodiment of the present invention.

DESCRIPTION OF THE PREFERRED EMBODIMENT

Figure 1:
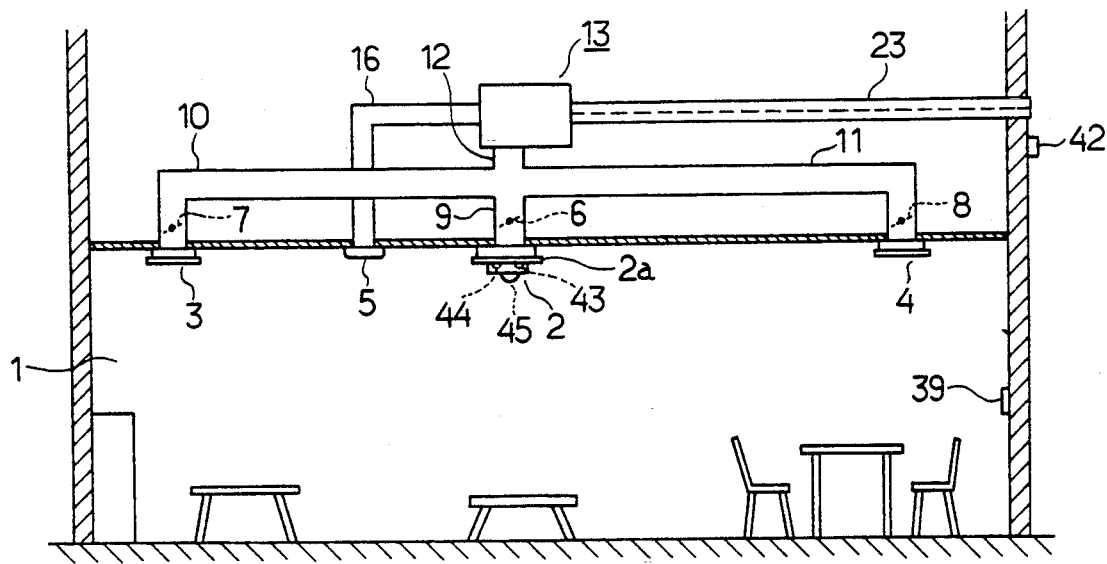

An embodiment of the present invention will be described with reference to FIGS. 1 to 9 Referring to FIG. 1, reference numeral 1 designates a relatively large room such as a living room. Air outlets 2-4 as exhausting openings are provided in the central portion, right-hand and left-hand sides of the ceiling of the room 1 for exhausting indoor air, as viewed in FIG. 1. An air inlet 5 is provided between the central and left-hand side air outlets 2, 3 in the ceiling for introducing outdoor air into the room 1. The air outlets 2-4 are provided with respective dampers 6-8 which are driven by respective electric motors 6a to 8a (see FIG. 8) as drive sources so as to be opened and closed. Exhaust ducts 9 to 11 are connected to the respective air outlets 2-4. The exhaust ducts 9-11 are further connected through a central exhaust duct 12 to an indoor inlet 15 formed in an outer casing 14 of a fan means or ventilating apparatus 13 shown in FIG. 2. The air inlet 5 is connected to an inlet duct 16 which is further connected to an indoor outlet 17 formed in the outer casing 14 of the ventilating apparatus 13.

Figure 2:
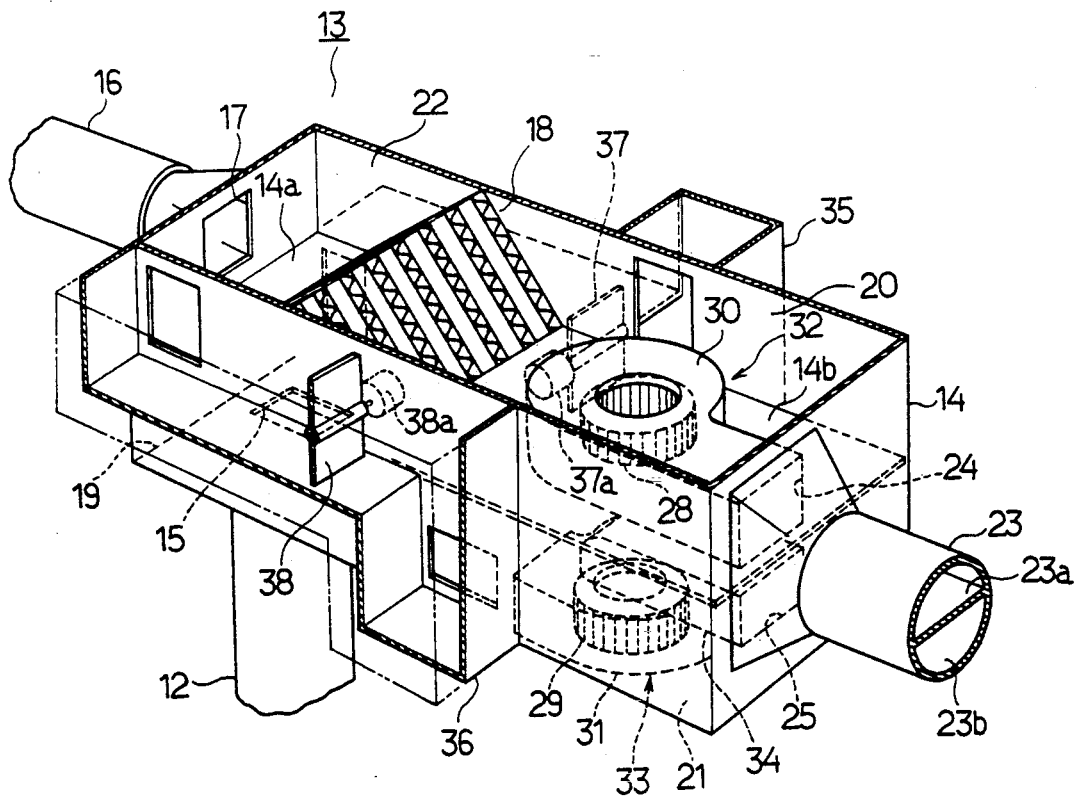
FIG. 2 is a partially cut-out enlarged perspective view of fan means with a heat exchanger of the ventilating apparatus.
Figure 3:
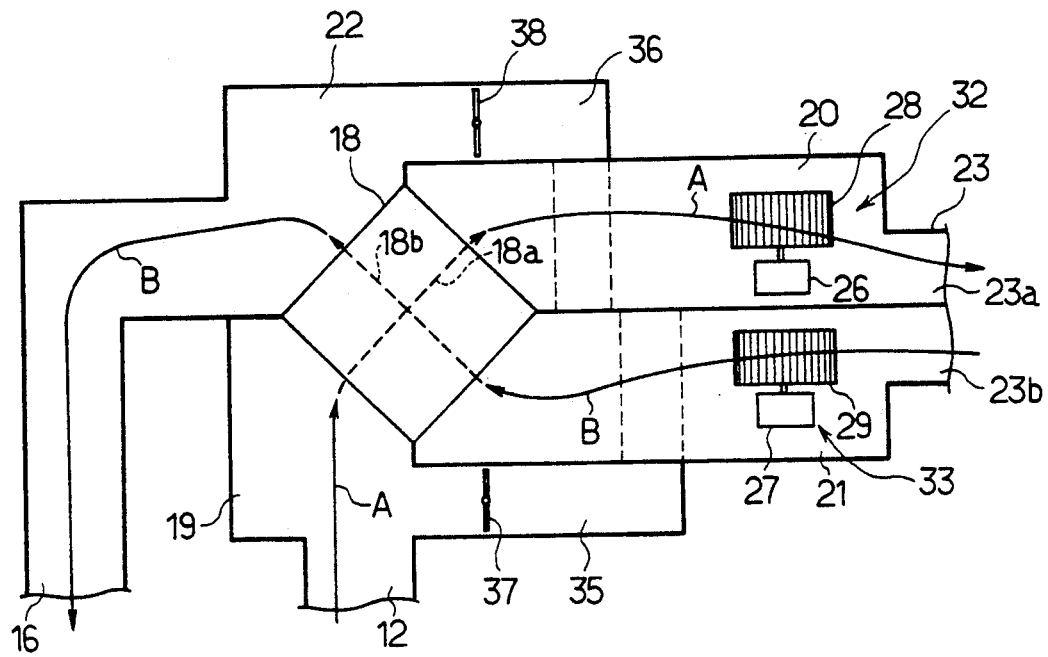
FIGS. 3 and 4 schematically illustrate air paths of the fan means with the heat, exchanger in the condition that air by-passes are closed and open respectively.
Figure 4:
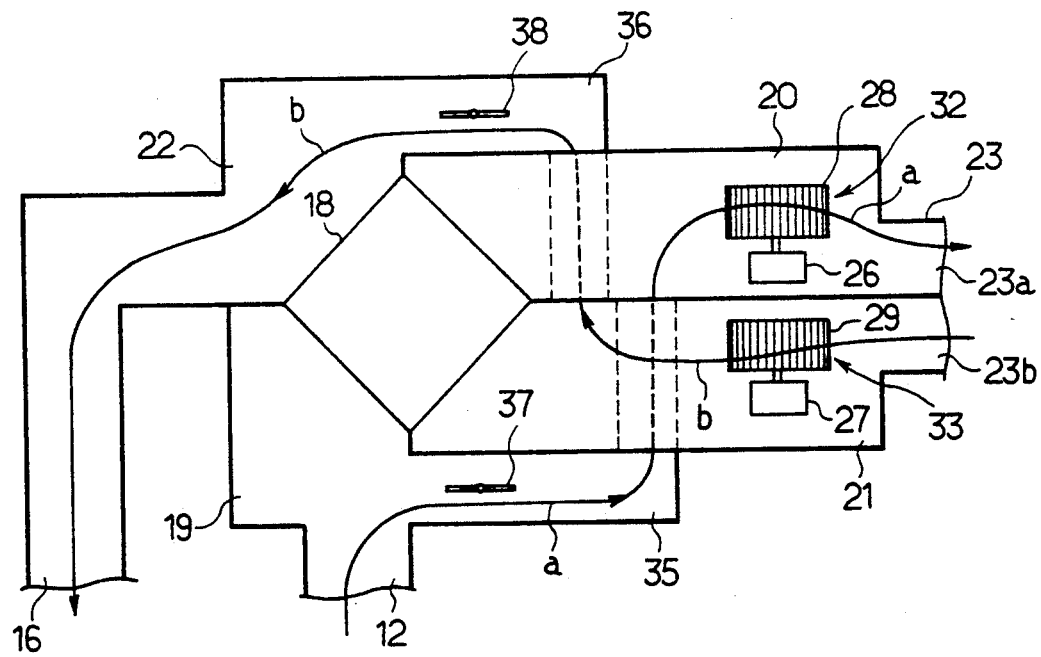

Referring to FIG. 2, a heat exchanger 18 is provided in the outer casing 14 of the ventilator 13 so as to partition the casing interior into right-hand and left-hand compartments, as viewed in FIG. 2. Furthermore, partition plates 14a and 14b are provided in the casing interior so as to partition each of the left-hand and right-hand compartments to upper and lower compartments. Accordingly, the casing interior is partitioned into four compartments 19 to 22 by the heat exchanger 18 and the partition plates 14a, 14b. The central exhaust duct 12 is communicated to the lower left-hand compartment 19 through the indoor inlet 15 formed in the bottom of the outer casing 14 The inlet duct 16 is communicated to the upper left-hand compartment 22 through the indoor outlet 17 formed in the left-hand side wall of the casing 14, as viewed in FIG. 2. One of two ends of a two-pass pipe 23 is connected to the right-hand side of the casing 13. The two-pass pipe 23 is communicated at the other end to the outdoors. An upper exhaust path 23a and a lower suction path 23b of the two-pass pipe 23 are communicated to an outdoor side outlet 24 formed in the right-hand side wall of the compartment 20 and an outdoor side inlet 25 formed in the right-hand side wall of the compartment 21, respectively.

Exhaust and suction blowers 32 and 33 are disposed in the right-hand upper and lower compartments 20 and 21. The blowers 32, 33 comprise centrifugal type vanes 28 and 29 driven by electric motors 26 and 27 (see FIGS. 3 and 4) and blower-casings 30 and 31 enclosing the vanes 28, 29, respectively. The blower-casing 30 of the exhaust blower 32 has an outlet coupled with the outdoor side outlet 24 and the blower-casing 31 of the suction blower 33 has an inlet communicated through a pipe 34 to the outdoor side inlet 25. Accordingly, upon driving of the exhaust blower 32, the indoor air is sucked into the compartment 20 sequentially through the exhaust ducts 9–11, the central exhaust duct 12, the compartment 19 and a path 18a of the heat exchanger 18 (shown by a broken line for convenience in FIG. 3) and then, exhausted outdoors through the blower-casing 30 and the exhaust path 23a of the two-pass pipe 23. The above-described air passage, is shown by an arrow A in FIG. 3. Upon driving the suction blower 33, an outdoor air is sucked into the blower-casing 31 through the suction path 23b of the two-pass pipe 23 and then, introduced into the room 1 sequentially through the compartment 21, the other path 18b of the heat exchanger 18 (shown by the other broken line in FIG. 3), the compartment 22 and the suction duct 16. The above-described air passage is shown by an arrow B in FIG. 3.

An exhaust by-pass 35 and a suction by-path 36 are provided on the rear and front side walls of the casing 14, respectively. The exhaust by-pass 35 communicates between the compartments 19 and 20. The suction by-path 36 communicates between the compartments 21 and 22. Dampers 37 and 38 are provided in the by-passes 35 and 36, respectively. The dampers 37, 38 are driven by drive sources such as respective electric motors 37a and 38a so as to be opened and closed. When the damper 37 is opened, most of the indoor air exhausted by the blower 32 is caused to directly flow from the compartment 19 into the compartment 20 through the by-pass 35 though a part of the indoor air unavoidably passes through the heat exchanger 18. The above-described air passage is shown by an arrow A in FIG. 4. Also, when the damper 38 is opened, most of the outdoor air sucked by the blower 33 is caused to directly flow from the compartment 21 into the compartment 22 though a part of the suction air unavoidably passes through the heat exchanger 18. The above-described suction air passage is shown by an arrow b in FIG. 4.

A control section 39 is provided on an inner wall of the room 1. The control section 39 comprises a switch for switching between automatic and manual operations, switches for changing an amount of air delivered by each of the blowers 32, 33 during the manual operation, a group 40 of switches (see FIG. 8) for opening and closing the respective dampers 6-8, 37 and 38 and a display 41 (see FIG. 8) for displaying the state of each switch.

Figure 5:
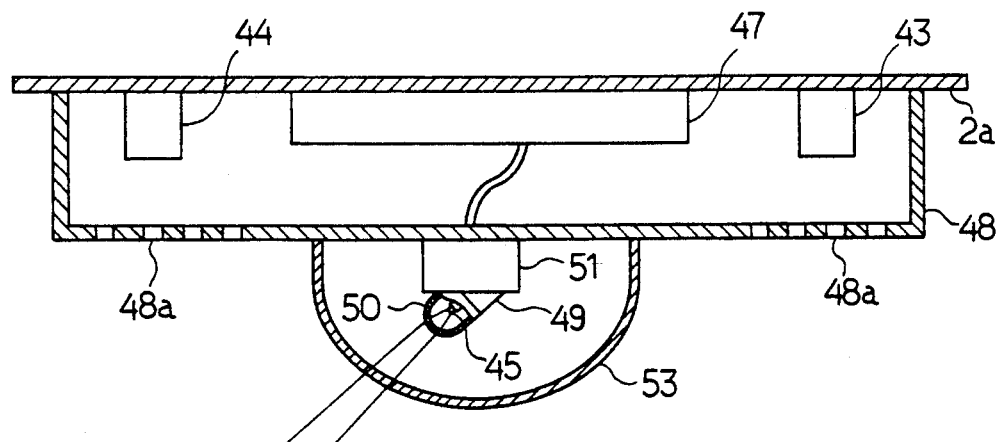
FIG. 5 is an enlarged longitudinal side view of a human body detector employed in the ventilating apparatus.
Figure 8:
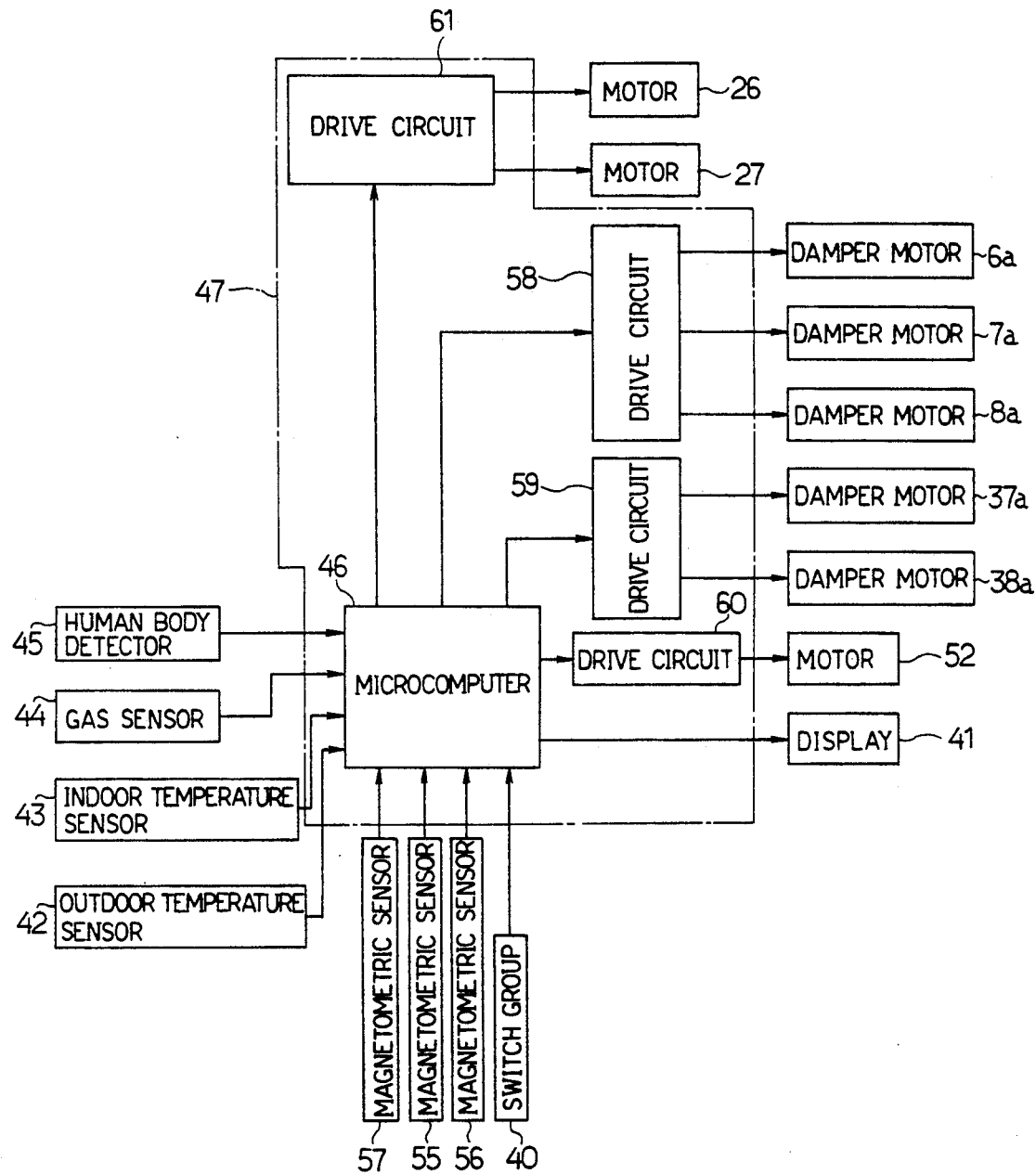
FIG. 8 is a block diagram illustrating an electrical arrangement of the ventilating apparatus.

An outdoor temperature sensor 42, an indoor temperature sensor 43, a gas sensor 44 serving as an air pollution sensor, and a human body detector 45 are provided for detecting environmental conditions for the control of the operation of the ventilating apparatus when the automatic operation is selected, as shown in FIG. 8. The outdoor temperature sensor 42 is mounted on an outdoor wall of the house. The indoor temperature sensor 43 and the gas sensor 44 are mounted on a flange portion 2a of the central exhaust opening 2 with a microcomputer-based control circuit 47 (see FIG. 8) as control means, as shown in FIGS. 1 and 5 These sensors 43, 44 and the control circuit 47 are covered by a cover 48 having a number of ventilation apertures 48a.

The human body detector 45 comprises a thermopile which is composed of a number of thermocouples series connected and disposed on a heat-sensing face thereof and generates a voltage signal proportional to the magnitude of thermal energy received by the thermocouples. Accordingly, when a person is within a detectable range of the human body detector 45, it receives heat emanating from the human body and consequently, the thermal energy received by the human body detector 45 is increased, thereby detecting the presence of the person. In order that the human body detector 45 can scan a plurality of detection areas which will be described later, the human body detector 45 is mounted on the lower end portion of a swinging member 49 provided on the underside of the cover 48 and is covered by a Fresnel lends 50 which is provided for limiting the detection area of the human body detector 45 to the range represented by ellipses C in FIG. 7. The swinging member 49 is mounted on a case 51 secured to the cover 48 so as to be swung crosswise as viewed in FIG. 6. The case 51 encloses an electric motor 52 (see FIG. 8) and a link mechanism (not shown) for converting rotation of the motor 52 to a reciprocal motion and transmitting the reciprocal motion to the swinging member 49. The swinging member 49 and the case 51 are covered by a hood 53 formed of a translucent material transmitting infrared rays and secured to the cover 48.

Figure 6:
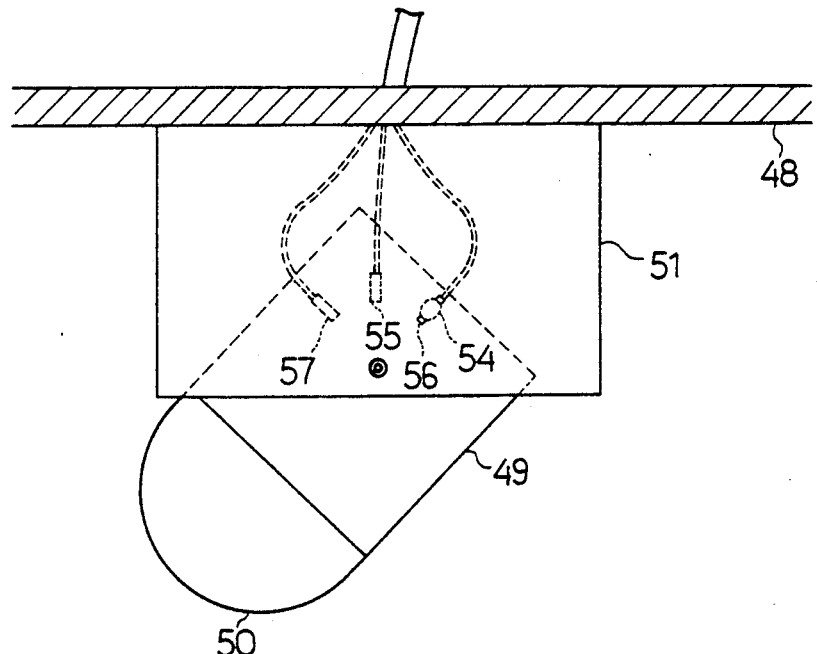
FIG. 6 is a side view illustrating an arrangement for detecting the position of the human body detector which is swung.

Referring to FIG. 6, the position of the swinging member 49 swinging is detected by employing a permanent magnet 54 and a plurality of magnetometric sensors 55 to 57. The permanent magnet 54 is mounted on the swinging member 49 and the magnetometric sensors 55-57 are intermittently mounted on the case 51 in the direction that the swinging member 49 swings. The positions of the magnetometric sensors 55-57 can be altered. Upon swinging of the swinging member 49, the permanent magnet 54 comes close sequentially to the magnetometric sensors 55-57 in accordance with the position of the swinging member 49. Accordingly, any one of the magnetometric sensors 55-57 generates an output signal in accordance with the position of the swinging member 49. The inclination of the swinging member 49 is detected by determining which of the magnetometric sensors has generated the output signal.

Referring to FIG. 8, the motors 6a-8a, 37a and 38a, 52, 26 and 27 are controlled via respective drive circuits 58-61 by a microcomputer 46. The output signals generated by the outdoor and indoor temperature sensors 42, 43, the gas sensor 44, the human body detector 45, the magnetometric sensors 55-57 and the switch groups 40 are supplied into the microcomputer 46, which then controls the ventilating operation in accordance with the supplied signals and a predetermined program.

In the automatic operation, the human body detector 45 is adapted to detect not only the presence or absence of a person or persons in the room 1 but the number of persons in the room 1. The volume of air delivered by each blower and accordingly, the numbers of revolution of the motors 26, 27 of the respective blowers 32, 33 are controlled in accordance with the detection result of the human body detector 45. The number of persons detected by the human body detector 45 does not represent the exact number of persons in the room 1. The human body detector 45 detects the presence or absence of a person or persons in each of a plurality of detection areas. When the number of the detection areas in which the presence of a person or persons is detected is small, it is determined that the number of persons in the room 1 is small. When the number of the detection areas in which the presence of a person or persons is detected is large, it is determined that the number of persons in the room 1 is large.

Figure 7:
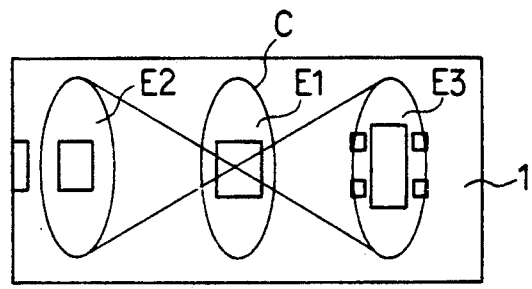
FIG. 7 is a plan view schematically illustrating sensing areas of the human body detector.

Now, consider the case where the room 1 interior is divided into three detection areas El, E2 and E3 in each of which the human body detector 45 detects the presence or absence of a person or persons, as shown in FIG. 7. The position of each of the magnetometric sensors 55-57 is set so that each magnetometric sensor is opposed to the permanent magnet 54 of the swinging member 49 when the range of the human body detector 45 corresponds to each of the detection areas E1-E3. Data of the level of the output signal generated by the human body detector 45 when the absence of a person is detected is stored in a memory provided in the microcomputer 46. In this condition, the microcomputer 46 operates to energize the motor 52 so that the swinging member 49 is swung. The microcomputer 46 inputs the output signal from the human body detector 45 when the detection signal is generated by each magnetometric sensor, that is, when the range of the human body detector 45 corresponds to each of the detection areas E1-E3. The microcomputer 46 then operates to compare the level of the output signal of the human body detector 45 with the level of the output signal representative of the absence of a person in the detection area corresponding to the magnetometric sensor which has generated the detection signal, the data of which signal level is previously stored in the memory. When the former is higher than the latter, it is determined that a person or persons are present in that detection area.

Figure 9:
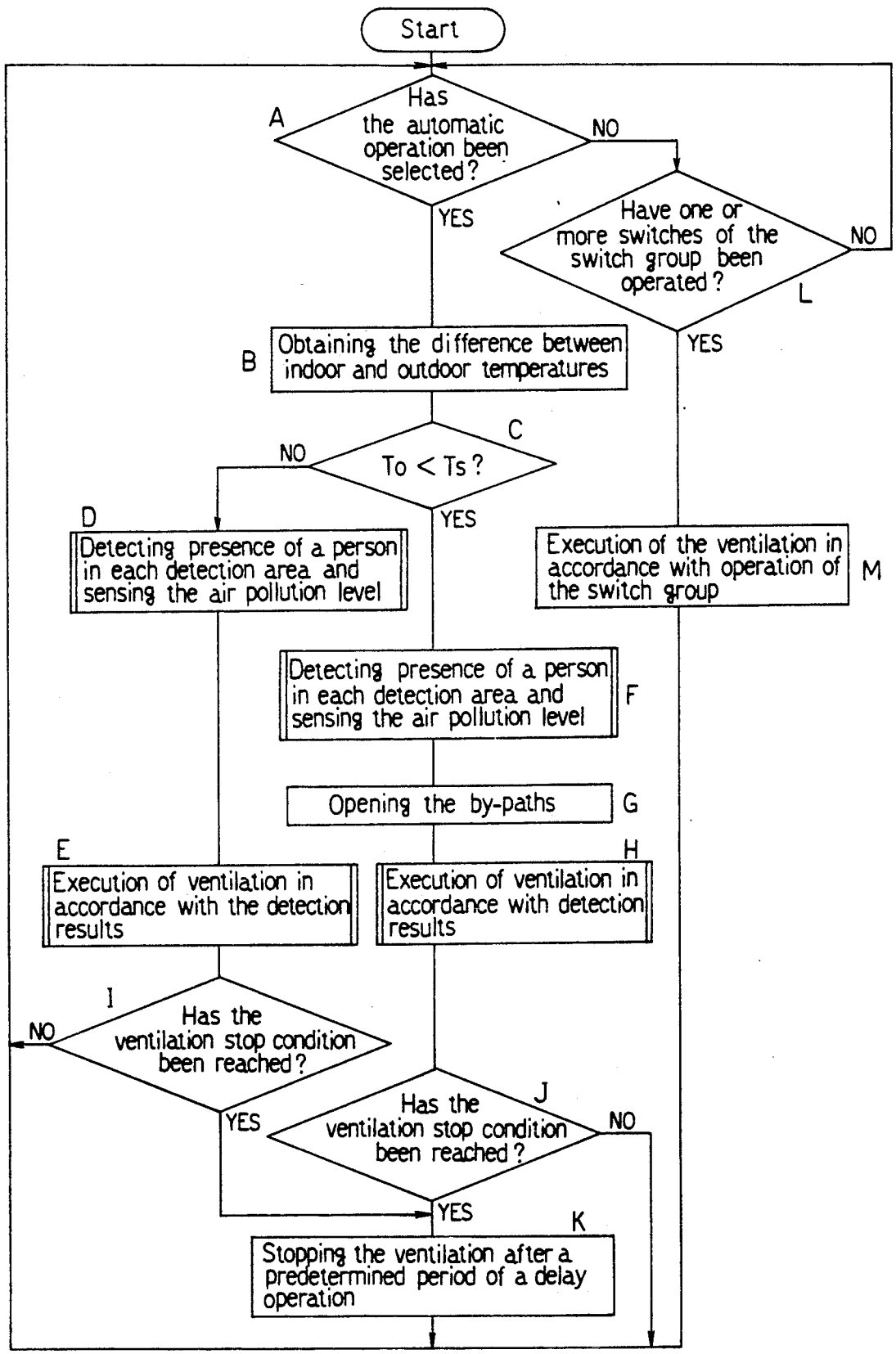
FIG. 9 is a flowchart illustrating the operation of control means employed in the ventilating apparatus.

The operation of the ventilating apparatus thus constructed will be described with reference to FIG. 9.

When a power supply is put to the ventilating apparatus, the microcomputer 46 determines which of the automatic and manual operations has been selected, at a step A. When the automatic operation is previously selected, the microcomputer 45 operates to obtain the difference between the temperatures sensed by the temperature sensors 42 and 43, at a step B. The microcomputer 46 then operates to determine whether or not the absolute value $T_o$ of the obtained difference is less than a predetermined value $T_s$, that is, whether or not the temperature difference is small, at a step C. When $T_o \geq T_s$ or when it is determined that the temperature difference is not small, the microcomputer 46 operates to detect the presence of a person or persons in the detection area as described above and operates the gas sensor 44 to sense the air pollution level in the room 1, at a step D. Subsequently, the microcomputer 46 operates to open one of the dampers 6–8 of the respective air outlets 2–4 corresponding to the detection area for which it has been determined that a person or persons are present and furthermore, the volume of air delivered by each of the blowers 32, 33 is set in accordance with the number of the detection areas for each of which it has been determined that a person or persons are present and the air pollution level in the room 1, at a step E. More specifically, the amount of ventilation is determined as follows:

A. The case where the air is not polluted in the room 1:

In the condition that the dampers 37, 38 of the respective by-passes 35, 36 are closed:

(1) Neither blowers 32, 33 are energized when is no detection area for which it has been determined that the presence of a person or persons is detected.

(2) Both motors 26, 27 are driven at a very slow speed so that a very small volume of air delivered by each blower is set, when the number of the detection areas for each of which it has been determined that the presence of a person or persons is detected, is 1.

(3) Both motors 26, 27 are driven at a low speed so that a small volume of air delivered by each blower is set, when the number of the detection areas for each of which it has been determined that the presence of a person or persons is detected, is 2.

(4) Both motors 26, 27 are driven at a medium speed so that a medium volume of air delivered by each blower is set, when the number of the detection areas for each of which it has been determined that the presence of a person or persons is detected, is 3.

B. The case where the air pollution level is low:

Also, in the condition that the by-pass dampers 37, 38 are closed:

(1) Both motors 26, 27 are driven at the very slow speed so that a very small volume of air delivered by each blower is set, when there is no detection area for which it has been determined that the presence of a person or persons is detected.

(2) Both motors 26, 27 are driven at the low speed so that a small volume of air delivered by each blower is set, when the number of the detection areas for each of which it has been determined that the presence of a person or persons is detected, is 1.

(3) Both motors 26, 27 are driven at the medium speed so that a medium volume of air delivered by each blower is set, when the number of the detection areas for each of which it has been determined that the presence of a person or persons is detected, is 2.

(4) Both motors 26, 27 are driven at a high speed so that a large volume of air delivered by each blower is set, when the number of the detection areas for each of which it has been determined that the presence of a person or persons is detected, is 3.

C. The case where the air pollution level is high:

In the condition that both by-pass dampers 37, 38 are opened:

(1) Both motors 26, 27 are driven at the very slow speed so that the very small volume of air delivered by each blower is set, when there is no detection area for which it has been determined that the presence of a person or persons is detected.

(2) Both motors 26, 27 are driven at the low speed so that the small volume of air delivered by each blower is set, when the number of the detection areas for each of which it has been determined that the presence of a person or persons is detected, is 1.

(3) Both motors 26, 27 are driven at the medium speed so that the medium volume of air delivered by each blower is set, when the number of the detection areas for each of which it has been determined that the presence of a person or persons is detected, is 2.

(4) Both motors 26, 27 are driven at the high speed so that the large volume of air delivered by each blower is set, when the number of the detection areas for each of which it has been determined that the presence of a person or persons is detected, is 3.

When both motors 26, 27 are driven in the condition that both dampers 37, 38 of the respective by-passes 35, 36 are closed, the indoor air is sucked by the blowers 32, 33 from one or more of the air outlets 2–4 corresponding to the detection area or areas for each of which it has been determined that the presence of a person or persons is detected and the outdoor air is sucked through the suction pass 23b of the two-pass pipe 23. The indoor air passes through the path 18a of the heat exchanger as shown by the arrow A in FIG. 3 and then, passes through the exhaust pass 23a of the two-pass pipe 23 to be exhausted outdoors. The outdoor air passes through the path 18b of the heat exchanger 18 as shown by the arrow B in FIG. 3 and then, is introduced into the room 1 through the air inlet 5. When the indoor air and the outdoor air pass through the heat exchanger 18 as described above, the heat exchange is performed between the indoor air and the outdoor air such that the outdoor air supplied into the room 1 is cooled in summer and warmed in winter. When the air pollution level in the room 1 is increased to the high level during the above-described operation of the ventilating apparatus, the dampers 37, 38 of the respective by-passes 35, 36 are opened. Then, the indoor air and the outdoor air by-pass the heat exchanger 18 into the respective by-passes 35, 36. Consequently, the volume of air delivered by each of the blowers 32, 33 is increased and the indoor air in the room 1 can be cleaned in a shorter period.

When $T_o < T_s$ at the step C or when the difference between the indoor and outdoor temperatures is small, the microcomputer 46 operates to execute a step F which is similar to the step D and then, to open the dampers 37, 38 of the respective by-passes 35, 36, at a step G. The microcomputer 46 further operates to open one or more of the dampers of the air outlets corresponding to one or more detection areas for each of which it has been determined that the presence of a person or persons is detected and further to execute the ventilating operation with the volume of air delivered in accordance with the number of the detection areas for each of which it has been determined that the presence of a person or persons is detected and the air pollution level in the room 1, under the same condition as described above, at a step H. Thereafter, when the air pollution is improved and no person is in the room 1 at a step I or J, a delay operation is performed for a predetermined period and then, both blowers 32, 33 are deenergized, at a step K.

In the condition that the manual operation mode has been selected, one or more switches of the switch group 40 are manually operated and the ventilating operation is performed in accordance with the operation of the switch group 40, at steps L and M.

In accordance with the above-described embodiment, the human body detector 45 detects the presence or absence of a person or persons in each of the detection areas E1-E3. The volume of air delivered by each blower for the ventilation is varied in accordance with the number of the detection areas for each of which it has been determined that the presence of a person or persons has been detected. Accordingly, the volume of air delivered by each blower for the ventilation can be set at an optimum value in accordance with the number of persons in the room. In the prior art, however, when the presence of a person or persons is detected, the ventilating operation is performed with a fixed volume of air delivered irrespective of the number of persons. Consequently, the volume of air delivered is too large or too small for the number of persons. In the present invention, however, such a problem can be solved.

Since the human body detector 45 is swung, the presence or absence of a person or persons in a plurality of detection areas can be detected by a single detector, which reduces the production cost.

The air outlets 2-4 are provided in a one-to-one relation with the detection areas E1-E3 and one or more air outlets corresponding to the detection areas for each of which it has been determined that the presence of a person or persons is detected are opened. Thus, the air in one or more detection areas for each of which it has been determined that the presence of a person or persons has been detected is at a higher pollution level than that in the other areas in the room and can be concentrically sucked, thereby performing an efficient ventilating operation.

When the air pollution level in the room is increased during the ventilating operation wherein the volume of air delivered by each blower is in accordance with the number of detection areas for each of which it has been determined that the presence of a person or persons has been detected, the number of revolution of each of the motors 26, 27 is changed such that the volume of air delivered by each blower for the ventilation in accordance with the air pollution level is added to that in accordance with the number of the detection areas in which a person or persons are present. Consequently, the ventilating operation can be performed with an optimum amount of ventilation in accordance with the number of persons and air pollution level in the room.

Furthermore, when the air pollution level is raised, the by-passes 35, 36 are opened with the number of revolution of each of the blower motors 26, 27 maintained at the value in accordance with the number of the detection areas for each of which it has been determined that the presence of a person or persons has been detected. Consequently, the indoor air and the outdoor air bypass the heat exchanger 18 and pass through the respective by-passes 35, 36. Thus, when the volume of air delivered by each blower for the ventilation needs to be increased after the increase in the air pollution level, and particularly, when each of the blower motors 26, 27 is in operation at its maximum speed with the detection areas in each of which a person or persons are present, the volume of air delivered for the ventilation is increased, resulting in rapid discharge of the polluted air.

Conventionally, the indoor air and the outdoor air are caused to pass through the heat exchanger even when the difference between the indoor and outdoor temperatures is small and the heat exchange scarcely takes place therebetween. In the present invention, however, the by-passes 35, 36 are opened when the difference between the indoor and outdoor temperatures is small. Consequently, such a defect as described above may be overcome and the ventilation efficiency may be improved.

Although the room 1 interior is divided into three detection areas in the foregoing embodiment, the number of the magnetometric sensors and accordingly, the number of the detection areas may be increased such that the detection areas cover the whole room interior.

Figure 10:
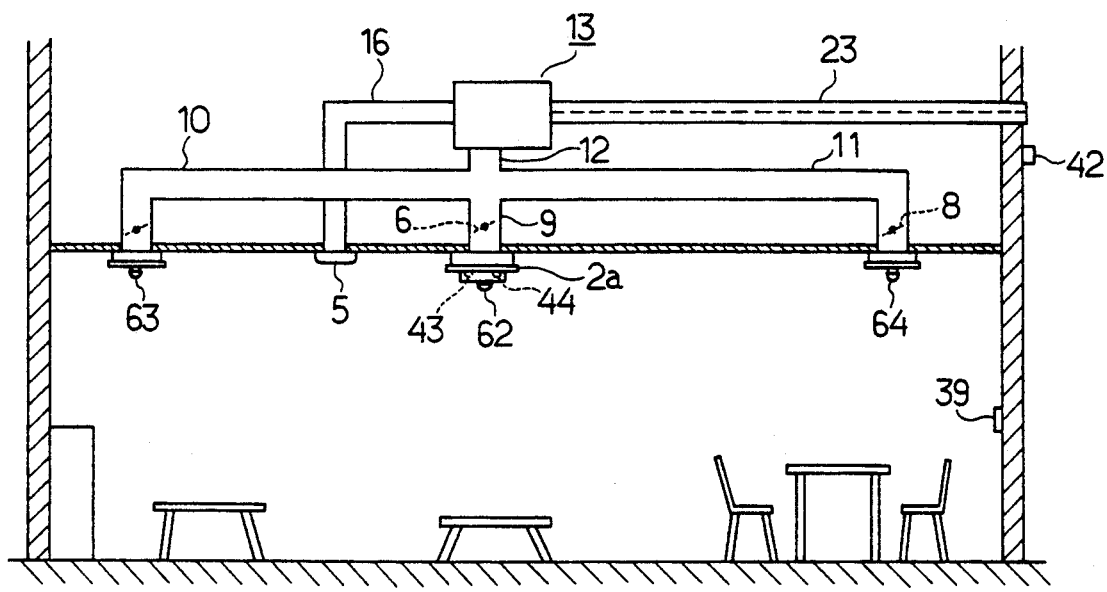
FIG. 10 is a view similar to FIG 1 showing another embodiment of the invention.

FIG. 10 illustrates a second embodiment of the invention. Three human body detectors 62 to 64 are provided on the respective air outlets 2-4 so as to detect the presence or absence of a person or persons in the respective detection areas E1-E3. Since each detection area is allotted to each one of the human body detectors 62-64, means for swinging the human body detector and means for detecting the position of the human body detector are not necessary.

Although the air outlets are provided in the respective detection areas in the foregoing embodiments, the number of the air outlets should not be limited to this. One such air outlet may be provided in the center of the ceiling in the case of a relatively small room.

The foregoing disclosure and drawings are merely illustrative of the principles of the invention and are not to be interpreted in a limiting sense. The only limitation is to be determined from the scope of the appended claims.

I claim:

1. A ventilating apparatus comprising fan means for ventilating a room, a human body detector for detecting the presence or absence of a person or persons in each of a plurality of detection areas in the room, and control means for varying the volume of air delivered by the fan means for the ventilation of the room in accordance with the number of detection areas for each of which the presence of a person or persons has been detected by the human body detector.

2. A ventilating apparatus according to claim 1, which further comprises swinging means for swinging the human body detector so that the plurality of detection areas are covered by the human body detector.

3. A ventilating apparatus according o claim 1, which further comprises a plurality of human body detectors for detecting the presence or absence of a person or persons in the plurality of detection areas respectively, instead of the single human body detector.

4. A ventilating apparatus comprising fan means for ventilating a room, a human body detector for detecting the presence or absence of a person or persons in each of a plurality of detection areas in the room, and control means for varying the volume of air delivered by the fan means for the ventilation of the room in accordance with the number of detection areas for each of which the presence of a person or persons has been detected by the human body detector wherein the room has ventilating openings provided in each detection area of the room and the control means comprises means for selectively opening one or more of the ventilating openings corresponding to the detection areas for each of which the presence of a person or persons has been detected by the human body detector.

5. A ventilating apparatus comprising fan means for ventilating a room, a human body detector for detecting the presence or absence of a person or persons in each of a plurality of detection areas in the room, swinging means for swinging the human body detector so that the plurality of detection areas are covered by the human body detector, and control means for varying the volume of air delivered by the fan means for the ventilation of the room in accordance with the number of detection areas for each of which the presence of a person or persons has been detected by the human body detector, wherein the room has ventilating openings provided in each detection area of the room and the control means comprises means for selectively opening one or more of the ventilating openings corresponding to the detection areas for each of which the presence of a person or persons has been detected by the human body detector.

6. A ventilating apparatus comprising fan means for ventilating a room, a human body detector for detecting the presence or absence of a person or persons in each of a plurality of detection ares in the room, control means for varying the volume of air delivered by the fan means for the ventilation of the room in accordance with the number of detection ares for each of which the presence of a person or persons has been detected by the human body detector, and an air pollution sensor for sensing a level of air pollution in the room and wherein the control means comprises means for adding a volume of air in accordance with the air pollution level sensed by the air pollution sensor to the volume of air delivered by the fan means for the ventilation in accordance with the number of detection areas for each of which the presence of a person or persons has been detected by the human body detector.

7. A ventilating apparatus according to claim 4, which further comprises an air pollution sensor for sensing the level of air pollution in the room and the control means comprises means for adding a volume of air in accordance with the air pollution level sensed by the air pollution sensor to the volume of air delivered by the fan means for the ventilation in accordance with the number of detection areas for each of which the presence o a person or persons has been detected by the human body detector.

8. A ventilating apparatus comprising fan means for ventilating a room, a human body detector for detecting the presence or absence of a person or persons in each of a plurality of detection areas in the room, control means for varying the volume of air delivered by the fan means for the ventilation of the room in accordance with the number of detection areas for each of which the presence of a person or persons has been detected by the human body detector, and indoor and outdoor temperature sensors for sensing the indoor and outdoor temperatures respectively and wherein the control means comprises means for adding a volume of air in accordance wit the temperatures sensed by the indoor and outdoor temperature sensors to the volume of air delivered by the fan means in accordance with the number of detection areas for each of which the presence of a person or persons has been detected by the human body detector.

9. A ventilating apparatus according to claim 4, which further comprises indoor and outdoor temperature sensors for sensing the indoor and outdoor temperatures respectively and the control means comprises means for adding a volume of air in accordance with the temperatures sensed by the indoor and outdoor temperature sensors to the volume of air delivered by the fan means in accordance with the number of detection areas for each of which he presence of a person or persons has been detected by the human body detector.

10. A ventilating apparatus according to claim 6, which further comprises a heat exchanger performing a heat exchange between the indoor air exhausted to the outdoor with the operation of the fan means and the outdoor air supplied into the room with the operation of the fan means, an exhaust by-pass through which the indoor air is exhausted to the outdoors without passing through the heat exchanger, a suction by-pass through which the outdoor air is supplied into the room without passing through the heat exchanger, and the control means comprises means for exhausting he indoor air o the outdoors and introducing the outdoor air into the room through the respective exhaust and suction by-passes when the level of air pollution sensed by the air pollution sensor exceeds a predetermined level.

11. A ventilating apparatus according to claim 8, which further comprises a heat exchanger performing a heat exchange between the indoor air exhausted to the outdoors with operation of the fan means and the outdoor air supplied into the room with operation of the fan means, an exhaust by-pass through which the indoor air is exhausted to the outdoors without passing through the heat exchanger, a suction by-pass through which he outdoor air is supplied into the room without passing through the heat exchanger and the control means comprises means for exhausting the indoor air to the outdoors and introducing the a outdoor air into he room through the respective exhaust and suction by-passes when the difference between the indoor and outdoor temperatures sensed by the respective indoor and outdoor temperature sensors is smaller than a predetermined value.

* * * * *